United States Patent
Shih

(10) Patent No.: US 9,848,478 B2
(45) Date of Patent: Dec. 19, 2017

(54) AUTOMATIC LIGHT ADJUSTING METHOD AND RELATED CAMERA

(71) Applicant: VIVOTEK INC., New Taipei (TW)

(72) Inventor: Li-Shan Shih, New Taipei (TW)

(73) Assignee: VIVOTEK INC., New Taipei (TW)

( * ) Notice: Subject to any disclaimer, the term of this patent is extended or adjusted under 35 U.S.C. 154(b) by 0 days.

(21) Appl. No.: 15/445,992

(22) Filed: Mar. 1, 2017

(65) Prior Publication Data
US 2017/0265275 A1  Sep. 14, 2017

(30) Foreign Application Priority Data
Mar. 8, 2016 (TW) .................................. 105107029

(51) Int. Cl.
 H05B 37/02 (2006.01)
 H04N 5/235 (2006.01)
(52) U.S. Cl.
 CPC ....... H05B 37/0227 (2013.01); H04N 5/2352 (2013.01); H04N 5/2354 (2013.01)
(58) Field of Classification Search
 CPC . H05B 37/0227; H04N 5/2352; H04N 5/2354
 See application file for complete search history.

(56) References Cited

U.S. PATENT DOCUMENTS

| | | | |
|---|---|---|---|
| 8,824,881 B2* | 9/2014 | Li | G03B 15/05 396/155 |
| 2010/0277610 A1* | 11/2010 | Kakkori | H04N 1/6086 348/223.1 |
| 2011/0280561 A1* | 11/2011 | Geffert | H04N 5/235 396/164 |
| 2013/0010161 A1* | 1/2013 | Lu | H04N 5/2354 348/234 |
| 2013/0120636 A1* | 5/2013 | Baer | H04N 5/2354 348/335 |
| 2014/0168459 A1* | 6/2014 | Spielberg | H04N 5/2354 348/222.1 |
| 2016/0125611 A1* | 5/2016 | Komatsu | G06T 7/0065 348/135 |

FOREIGN PATENT DOCUMENTS

| CN | 104092953 A | 10/2014 |
|---|---|---|
| TW | 200511897 | 3/2005 |

\* cited by examiner

Primary Examiner — Tung X Le
Assistant Examiner — Raymond R Chai
(74) Attorney, Agent, or Firm — Winston Hsu

(57) ABSTRACT

An automatic light adjusting method applied to a camera having at least one image capturing unit and a plurality of lighting units includes driving the plurality of lighting units to output maximal illumination, driving the at least one image capturing unit to acquire a first image by a first exposure duration, calculating a plurality of first light intensity of a plurality of regions on the first image, comparing the plurality of first light intensity with a predetermined range, and determining whether to set a first ratio about the plurality of first light intensity as a lighting limitation ratio of the plurality of lighting units according to a comparison result.

20 Claims, 5 Drawing Sheets

AUTOMATIC LIGHT ADJUSTING METHOD AND RELATED CAMERA

BACKGROUND OF THE INVENTION

1. Field of the Invention

The present invention relates to a light adjusting method and a related camera, and more particularly, to an automatic light adjusting method and a related camera.

2. Description of the Prior Art

For all-weather environmental monitoring, the monitoring apparatus disposes a plurality of light sources around the camera to provide illumination light while surrounding brightness is insufficient, and the camera can capture the clear image accordingly. The plurality of light sources is respectively disposed on different orientation around the camera, and intervals between the light sources and the camera may be dissimilar from each other. The conventional monitoring apparatus synchronously increases or decreases light intensity of those light sources, and cannot adjust light intensity of each light source according to content of the monitoring image, which means the monitoring image may have inferior quality due to an over-bright scene and/or an over-dark scene probably formed on the monitoring image.

SUMMARY OF THE INVENTION

The present invention provides an automatic light adjusting method and a related camera for solving above drawbacks.

According to the claimed invention, an automatic light adjusting method applied to a camera having a plurality of lighting units and at least one image capturing unit is disclosed. The automatic light adjusting method includes steps of driving the plurality of lighting units to output maximal light intensity, driving the at least one image capturing unit to capture a first image by a first exposure duration, computing a plurality of first light intensity of a plurality of regions on the first image, comparing the plurality of first light intensity with a predetermined range, and determining whether to set a first ratio about the plurality of first light intensity as a lighting limitation ratio of the plurality of lighting units according to a comparison result.

According to the claimed invention, a camera includes at least one image capturing unit, a plurality of lighting units and an operational processor. The at least one image capturing unit is adapted to capture an image. The plurality of lighting units is disposed around the at least one image capturing unit. The operational processor is electrically connected to the at least one image capturing unit and the plurality of lighting units. The operational processor is adapted to drive the plurality of lighting units to output maximal light intensity, to drive the at least one image capturing unit to capture a first image by a first exposure duration, to compute a plurality of first light intensity of a plurality of regions on the first image, to compare the plurality of first light intensity with a predetermined range, and to determine whether to set a first ratio about the plurality of first light intensity as a lighting limitation ratio of the plurality of lighting units according to a comparison result.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
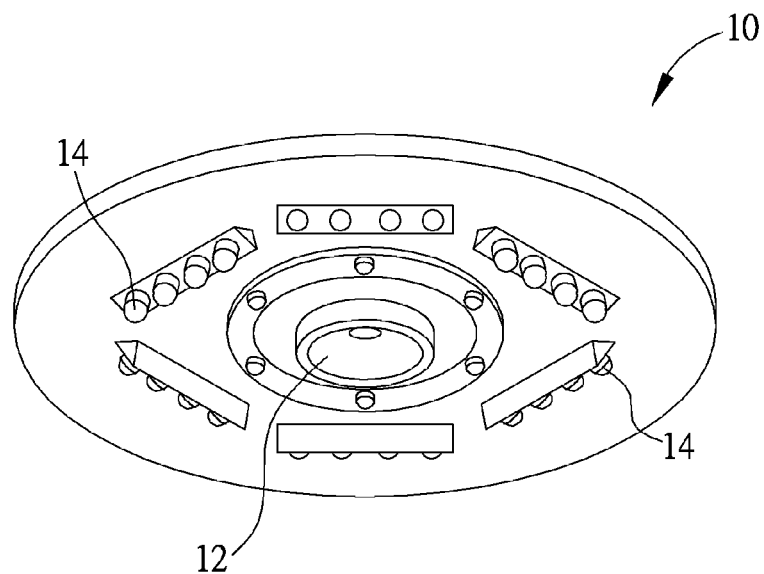
FIG. 1 is a diagram of a camera according to an embodiment of the present invention.
Figure 2:
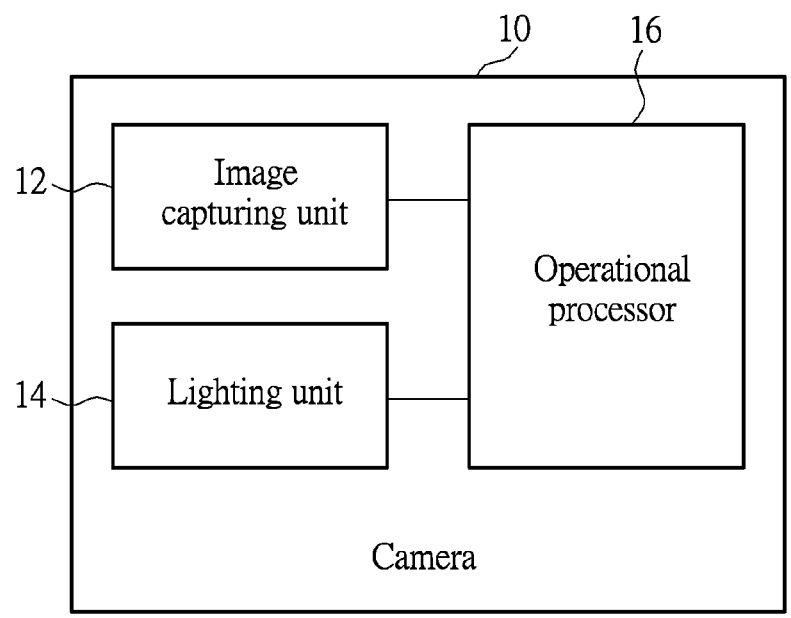
FIG. 2 is a functional block diagram of the camera according to the embodiment of the present invention.

Please refer to FIG. 1 and FIG. 2. FIG. 1 is a diagram of a camera 10 according to an embodiment of the present invention. FIG. 2 is a functional block diagram of the camera 10 according to the embodiment of the present invention. The camera 10 includes at least one image capturing unit 12, a plurality of lighting units 14 and an operational processor 16. The plurality of lighting units 14 is disposed around the image capturing unit 12 to provide illumination, and the image capturing unit 12 can capture a clear image about a monitoring region. The operational processor 16 is electrically connected to the image capturing unit 12 and the plurality of lighting units 14. The operational processor 16 can execute an automatic light adjusting method of adjusting light intensity of the plurality of lighting units 14 respectively located at different position, so that these lighting units 14 can provide preferred light distribution efficacy to the image capturing unit 12 for preventing the image from over-brightness or over-darkness.

Figure 3:
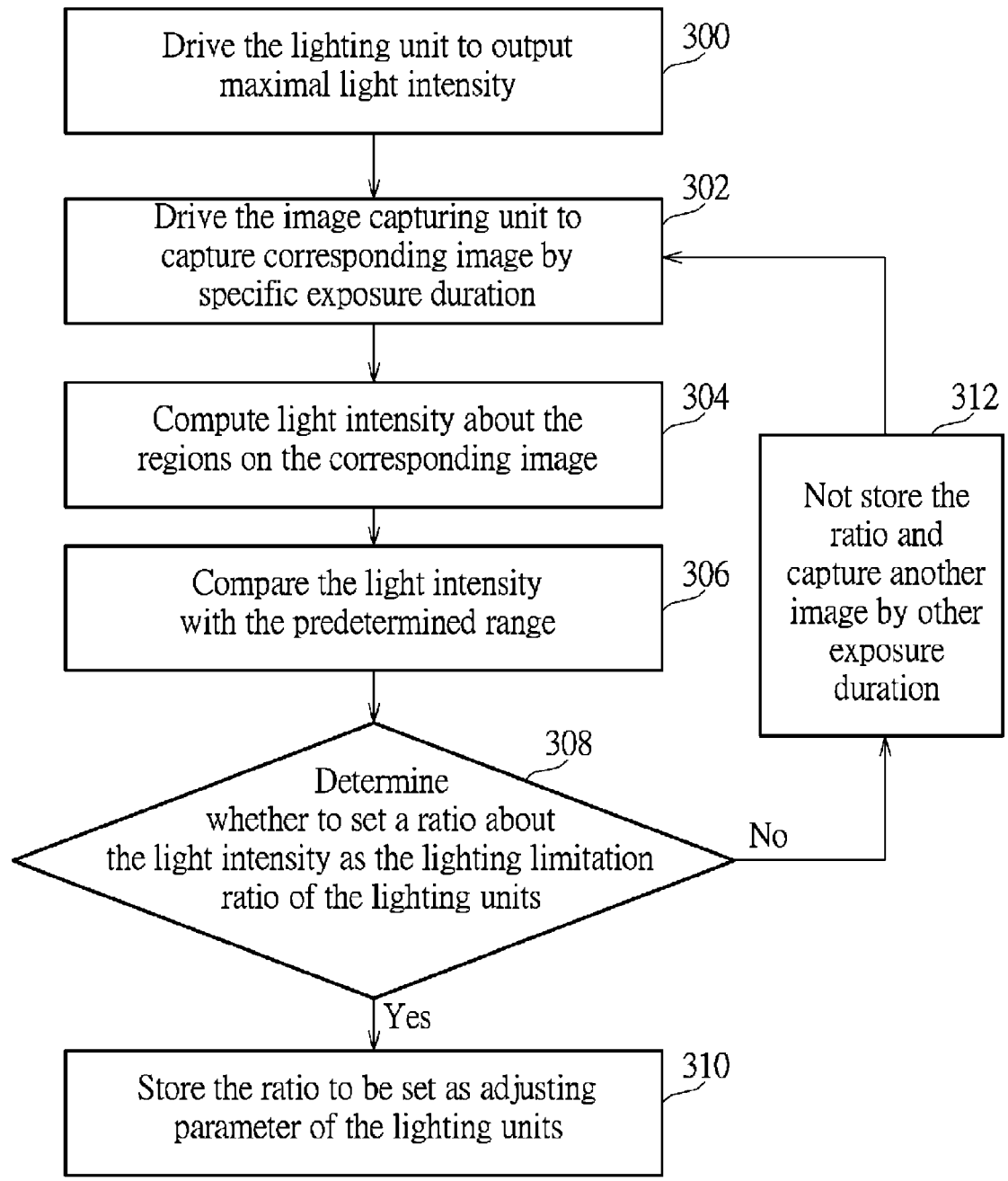
FIG. 3 is a flowchart of the automatic light adjusting method according to the embodiment of the present invention.
Figure 4:
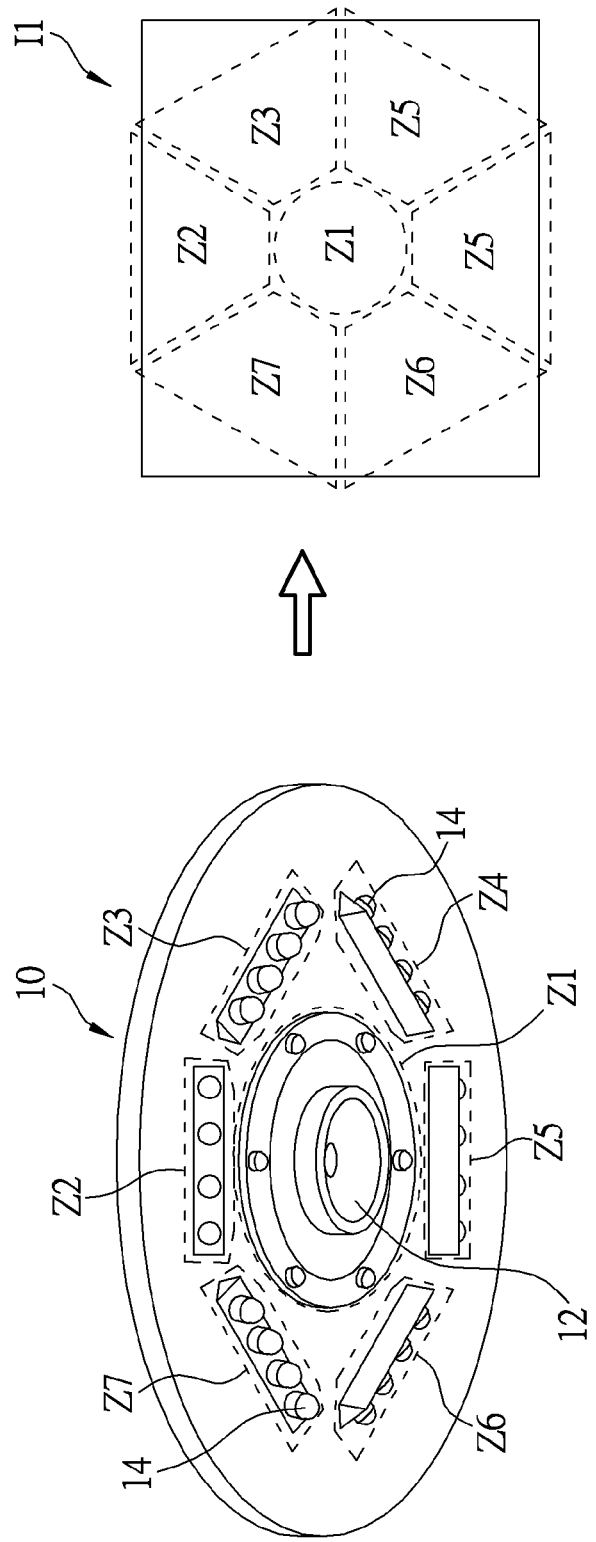
FIG. 4 is a diagram of the camera 10 and the related captured image according to the embodiment of the present invention.

Please refer to FIG. 3 and FIG. 4. FIG. 3 is a flow chart of the automatic light adjusting method according to the embodiment of the present invention. FIG. 4 is a diagram of the camera 10 and the related captured image according to the embodiment of the present invention. The automatic light adjusting method illustrated in FIG. 3 is suitable for the camera 10 shown in FIG. 1 and FIG. 2. First, step 300 and step 302 are executed that the operational processor 16 drives the plurality of lighting units 14 to output maximal light intensity, and drives the image capturing unit 12 to capture a corresponding image by a specific exposure duration (in an initial mode, the first image I1 is captured by the first exposure duration). Then, step 304 is executed that the operational processor 16 computes a plurality of corresponding light intensity (such like the plurality of first light intensity) about a plurality of regions $Z1 \sim Z7$ on the corresponding image (such like the first image I1). Dimensions and arrangement of the plurality of regions $Z1 \sim Z7$ on the first image I1 are designed according to an amount and distribution of the plurality of lighting units 14 surrounding the image capturing unit 12, as shown in FIG. 4, and an actual application can be varied accordingly. Further, step 306 and step 308 are executed that the operational processor 16 compares the plurality of first light intensity with a predetermined range, and determines whether to set a first ratio about the plurality of first light intensity as a lighting limitation ratio of the plurality of lighting units 14.

In this embodiment, the predetermined range can be ranged between a maximal light intensity value (such as the light intensity equal to 100 nits) and a minimal light intensity value (such as the light intensity equal to 0 nits) of the lighting unit 14. While the plurality of first light intensity is all within the predetermined range, step 310 is executed that the automatic light adjusting method sets the first ratio of those first light intensity as the lighting limitation ratio of the plurality of lighting units 14, and the first ratio is stored to be set as a plurality of adjusting parameters of the lighting units 14. It should be mentioned that the automatic light adjusting method utilizes normalize computation to transform the foresaid first ratio into the plurality of adjusting parameters of the lighting units 14, which means input current intensity of the lighting units 14 can be adjusted in accordance with the said ratio to control its light intensity. While at least one of the plurality of first light intensity is out of the predetermined range, as illustrated in the following table 1, a few of the lighting units 14 is over-exposure or over-darkness, and the automatic light adjusting method executes step 312 to not set the first ratio as the lighting limitation ratio of the plurality of lighting units 14.

TABLE 1

|  | first exposure duration | second exposure duration | Third exposure duration | Nth exposure duration |
|---|---|---|---|---|
| region Z1 | 100 nits | 90 nits | 22 nits | . . . |
| region Z2 | 80 nits | 20 nits | 5 nits | . . . |
| region Z3 | 100 nits | 100 nits | 70 nits | . . . |
| region Z4 | 100 nits | 90 nits | 22 nits | . . . |
| region Z5 | 80 nits | 20 nits | 5 nits | . . . |
| region Z6 | 100 nits | 100 nits | 70 nits | . . . |
| region Z7 | 80 nits | 20 nits | 5 nits | . . . |

Then, the automatic light adjusting method further executes steps 302~308, the operational processor 16 acquires a second image by a second exposure duration, computes a plurality of second light intensity of the plurality of regions on the second image, and compares the plurality of second light intensity with the foresaid predetermined range. While the plurality of second light intensity is within the predetermined range, the automatic light adjusting method sets a second ratio about those second light intensity as the lighting limitation ratio of the plurality of lighting units 14; while at least one of the plurality of second light intensity is out of the predetermined range, the automatic light adjusting method executes steps 302~308 to acquire a third image and a plurality of third light intensity by a third exposure duration. As illustrated in the above-mentioned table 1, the plurality of third light intensity is within the predetermined range, and the automatic light adjusting method can set a ratio about the said third light intensity as the lighting limitation ratio of the plurality of lighting units 14.

In this embodiment of the present invention, the automatic light adjusting method preferably decreases exposure duration while the images are successively captured, for example, the second exposure duration can be shorter than the first exposure duration, and the third exposure duration can be shorter than the second exposure duration, which depends on design demand. The (N+1)th exposure duration can be longer than the Nth exposure duration.

According to the above-mentioned flow chart, while step 312 is executed at a second time and the automatic light adjusting method does not set the second ratio as the lighting limitation ratio of the plurality of lighting units 14, the automatic light adjusting method not only can execute steps 302~308 to acquire the third image and the plurality of third light intensity by the third exposure duration, but also can optionally compare the plurality of second light intensity with the plurality of first light intensity. While one of the plurality of first light intensity or the plurality of second light intensity corresponding to the plurality of regions Z1~Z7 is out of the predetermined range, and another one of the plurality of first light intensity or the plurality of second light intensity is within the predetermined range, the automatic light adjusting method can respectively compute the first ratio and the second ratio, and then transform relation between the two ratios (such as arithmetic average of the first ratio and the second ratio) into the lighting limitation ratio by numerical computation.

As an example about the regions Z1~Z3 during the second exposure duration and the third exposure duration illustrated in Table 1, ratio relation between the regions Z1~Z3 of the image captured by the second exposure duration can be viewed as 1:0.2:1.1, and ratio relation between the regions Z1~Z3 of the image captured by the third exposure duration can be viewed as 1:0.23:3.18. Light intensity of the regions Z1 and Z2 during the second exposure duration and the third exposure duration are within the predetermined range, light intensity of the region Z3 is out of the predetermined range during the second exposure duration and is within the predetermined range till the third exposure duration. Ratio of the region Z2 to the region Z1 is computed between 0.2~0.23, ratio of the region Z3 to the region Z1 is computed as a value nearby ones acquired during the third exposure duration via numerical computation while light intensity of the second exposure duration exceeds the predetermined range; for example, the above-mentioned two ratio relation can be transformed as 1:0.2:3, which depends on actual demand.

Figure 5:
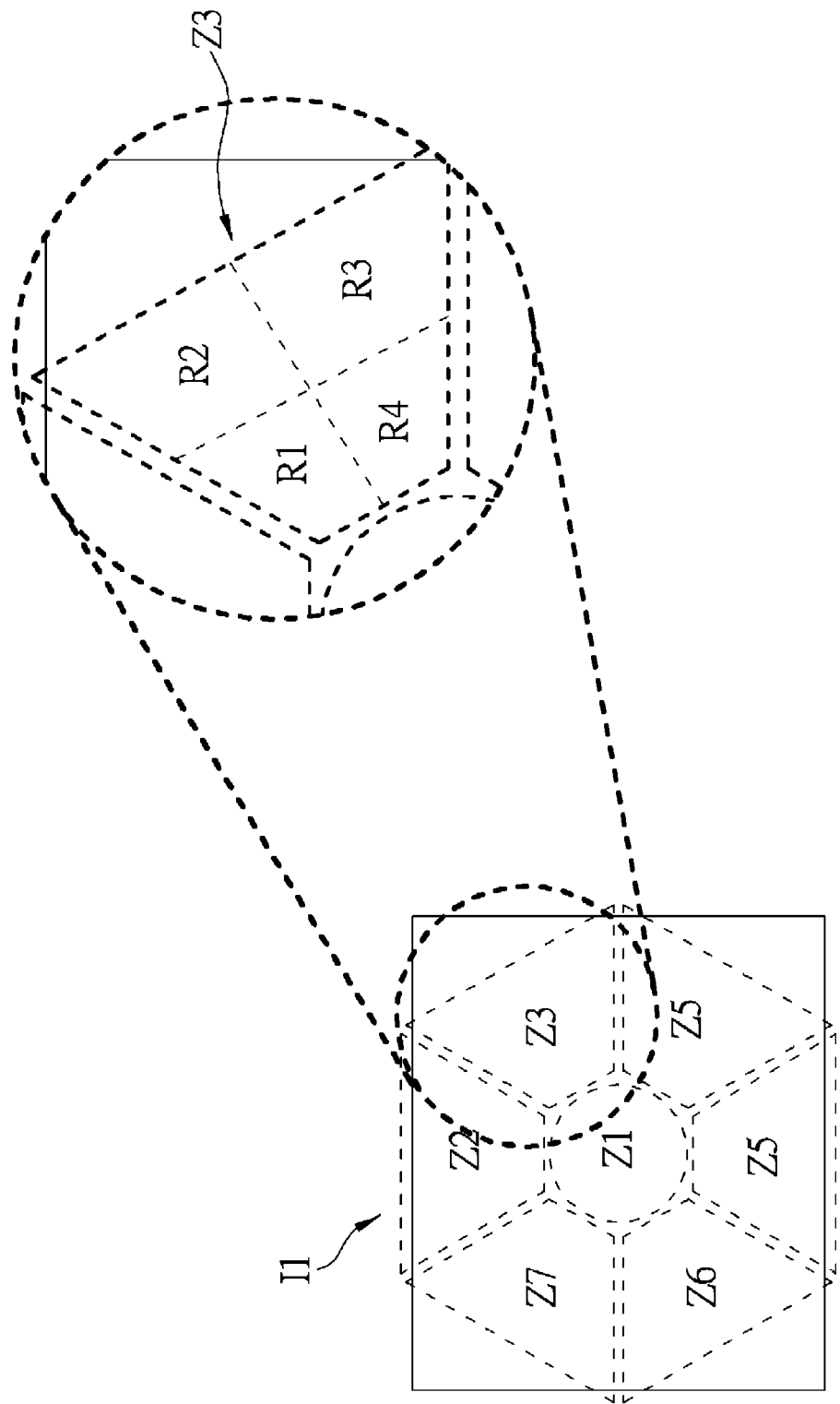
FIG. 5 is a diagram of the regions divided on the image captured by the camera according to the embodiment of the present invention.

Please refer to FIG. 5. FIG. 5 is a diagram of the regions divided on the image captured by the camera 10 according to the embodiment of the present invention. For preventing computation accuracy of the lighting limitation ratio from being affected by the bright scene or dark scene on the image captured by the image capturing unit 12, the automatic light adjusting method of the present invention can compute light intensity distribution about each region from the plurality of regions Z1~Z7 before computing light intensity of the each region on the image; as an example of the region Z3 shown in FIG. 5, the light intensity distribution of the region Z3 can be divided into four sub-regions R1~R4 (an amount of the sub-region is not limited to the said application). Then, the automatic light adjusting method can eliminate image blocks corresponding to the over-bright scene or the over-dark scene from the light intensity histogram or the related sub-regions in accordance with the predetermined threshold range, and only the sub-region within the threshold range is processed by numerical computation. For example, as the sub-region R1 corresponds to the over-bright scene (which can be an illumination device or a light source on the image) or the over-dark scene (which can be a shadow on the image), the automatic light adjusting method can utilize the sub-regions R2~R4 to compute the light intensity of the region Z3, so as to acquire the light intensity and the related ratio relation about the plurality of regions.

Except the foresaid manner of directly eliminating the sub-region corresponding to the over-bright scene or the over-dark scene, the automatic light adjusting method of the present invention further can apply weighting parameter to the light intensity distribution outside the threshold range, as an example shown in FIG. 5, the automatic light adjusting method can apply the lower transformation weighting to the sub-region R1 while the sub-region R1 corresponds to the over-bright scene, and automatic light adjusting method further can apply the greater transformation weighting to the sub-region R1 while the sub-region R1 corresponds to the over-dark scene. That is to say, the automatic light adjusting method can transform the sub-region (the light intensity distribution) outside the threshold range by weighting, and then utilize a value of the weighted light intensity distribution (such as the sub-region R1) and values of the non-weighted light intensity distribution (such as the sub-regions R2~R4) to compute the light intensity and the related ratio about of the plurality of regions.

Figure 6:
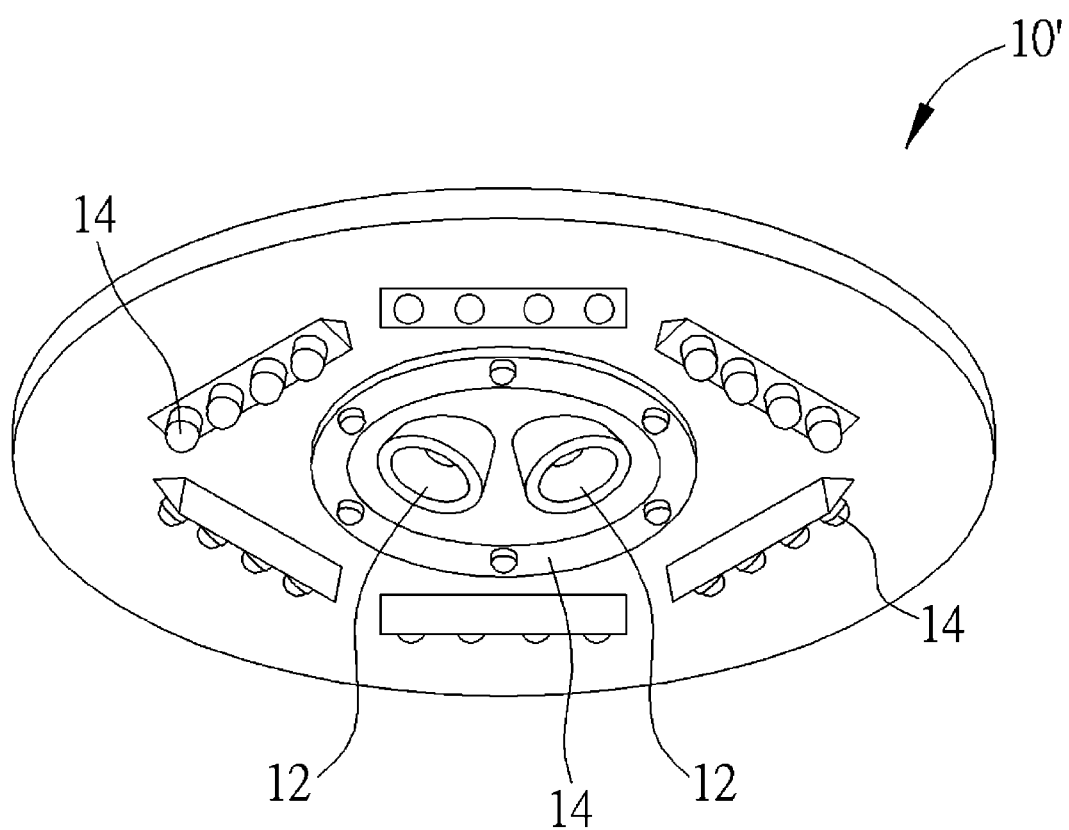
FIG. 6 is a diagram of the camera according to another embodiment of the present invention.

Please refer to FIG. 6. FIG. 6 is a diagram of a camera 10' according to another embodiment of the present invention. In the other possible embodiments, the camera 10' not only has the lighting units 14 and the operational processor 16, but also can include a plurality of image capturing units 12. The plurality of image capturing units 12 respectively faces toward different view ranges, and an amount and sizes of view angle of the image capturing unit 12 are varied according to user's actual demand. For instance, when the view angle of the image capturing unit 12 is equal to 90 degrees, the camera 10' may have four image capturing units 12 pointing toward different orientation to acquire the panorama image; when the view angle of the image capturing unit 12 is equal to 180 degrees, the camera 10' can have two image capturing units 12 pointing toward different orientation. While the images captured by the plurality of image capturing units 12 are stitched to generate the panorama image by the camera 10', the automatic light adjusting procedure is applied to the panorama image accordingly. In the present invention, the lighting units 14 around the plurality of image capturing units 12 correspond to the region Z1 on the image, and the other lighting units 14 respectively correspond to the regions Z2~Z7 according to its location. The following automatic light adjusting procedure is similar to the embodiment mentioned as above, and a detailed description is omitted herein for simplicity.

In conclusion, the camera of the present invention preferably can be the fisheye camera, and the automatic light adjusting method provides perfect full region illumination toward the fisheye camera. The automatic light adjusting method utilizes an exposure adjusting function of the camera to capture images by different exposure duration, and divides the image into several regions in accordance with distribution of the lighting units to compute the light intensity of each region. While the light intensity are within the predetermined range, such as information acquired by the third exposure duration illustrated in Table 1, ratio between the light intensity can be set as the lighting limitation ratio of the plurality of lighting units; while a few of the light intensity are out of the predetermined range, the automatic light adjusting method captures an image by distinct exposure duration and analyzes light intensity of each region on the newly-captured image, and the ratio corresponding to the light intensity can be set as the lighting limitation ratio of the plurality of lighting units until the light intensity of each region are all within the predetermined range.

The present invention can vary the exposure duration to capture the image with the regional light intensity conforming to the predetermined range; in addition, the present invention further can acquire the lighting limitation ratio by computing ratios that have a plurality of light intensity not completely conforming to the predetermined range during different exposure duration, and the ratio computation may be mean value calculation or any other way. The automatic light adjusting method of the present invention can eliminate and/or weight the specific sub-region to adjust the over-bright scene and the over-dark scene on the image, so as to accurately compute the desired light distribution of the regions on the monitoring image and to provide the preferred light distribution strategy for the camera and the related lighting units.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An automatic light adjusting method applied to a camera having a plurality of lighting units and at least one image capturing unit, the automatic light adjusting method comprising:
   driving the plurality of lighting units to output maximal light intensity;
   driving the at least one image capturing unit to capture a first image by a first exposure duration;
   computing a plurality of first light intensity of a plurality of regions on the first image;
   comparing the plurality of first light intensity with a predetermined range; and
   determining whether to set a first ratio about the plurality of first light intensity as a lighting limitation ratio of the plurality of lighting units according to a comparison result.

2. The automatic light adjusting method of claim 1, further comprising:
   dividing the first image into the plurality of regions according to an amount and distribution of the plurality of lighting units.

3. The automatic light adjusting method of claim 1, wherein the first ratio is set as the lighting limitation ratio of the plurality of lighting units while the plurality of first light intensity is within the predetermined range.

4. The automatic light adjusting method of claim 3, wherein while the first ratio is determined to be set as the lighting limitation ratio of the plurality of lighting units, the automatic light adjusting method further comprises:
   storing the first ratio to be set as a plurality of adjusting parameters of the plurality of lighting units.

5. The automatic light adjusting method of claim 4, wherein the first ratio is normalized to acquire the plurality of adjusting parameters.

6. The automatic light adjusting method of claim 1, wherein the first ratio is not set as the lighting limitation ratio of the plurality of lighting units while at least one of the plurality of first light intensity is out of the predetermined range.

7. The automatic light adjusting method of claim 6, wherein while the first ratio is determined not to be set as the lighting limitation ratio of the plurality of lighting units, the automatic light adjusting method further comprises:
   driving the at least one image capturing unit to capture a second image by a second exposure duration, wherein the second exposure duration is longer than or shorter than the first exposure duration;
   computing a plurality of second light intensity of the plurality of regions;

comparing the plurality of second light intensity with the predetermined range; and determining whether to set a second ratio about the plurality of second light intensity as the lighting limitation ratio of the plurality of lighting units according to a comparison result.

8. The automatic light adjusting method of claim 7, wherein while the second ratio is determined not to be set as the lighting limitation ratio of the plurality of lighting units, the automatic light adjusting method further comprises:

comparing the plurality of second light intensity with the plurality of first light intensity, wherein while one of the plurality of first light intensity or the plurality of second light intensity corresponding to the plurality of regions is out of the predetermined range and another one of the plurality of first light intensity or the plurality of second light intensity is within the predetermined range, the automatic light adjusting method utilizes the first ratio and the second ratio to acquire the lighting limitation ratio by numerical computation.

9. The automatic light adjusting method of claim 1, wherein while a step of computing the plurality of first light intensity of the plurality of regions on the first image is executed, the automatic light adjusting method further comprises:

computing a plurality of light intensity distribution about the plurality of regions respectively; and utilizing the plurality of light intensity distribution within a threshold range to acquire a corresponding first light intensity by numerical computation.

10. The automatic light adjusting method of claim 1, wherein while a step of computing the plurality of first light intensity of the plurality of regions on the first image is executed, the automatic light adjusting method further comprises:

computing a plurality of light intensity distribution about the plurality of regions respectively;

weighting the plurality of light intensity distribution out of a threshold range; and utilizing the plurality of weighted light intensity distribution to acquire the plurality of first light intensity by numerical computation.

11. A camera comprising:

at least one image capturing unit adapted to capture an image;

a plurality of lighting units disposed around the at least one image capturing unit; and an operational processor electrically connected to the at least one image capturing unit and the plurality of lighting units, the operational processor being adapted to drive the plurality of lighting units to output maximal light intensity, to drive the at least one image capturing unit to capture a first image by a first exposure duration, to compute a plurality of first light intensity of a plurality of regions on the first image, to compare the plurality of first light intensity with a predetermined range, and to determine whether to set a first ratio about the plurality of first light intensity as a lighting limitation ratio of the plurality of lighting units according to a comparison result.

12. The camera of claim 11, wherein the operational processor is further adapted to divide the first image into the plurality of regions according to an amount and distribution of the plurality of lighting units.

13. The camera of claim 11, wherein the first ratio is set as the lighting limitation ratio of the plurality of lighting units while the plurality of first light intensity is within the predetermined range.

14. The camera of claim 13, wherein while the first ratio is determined to be set as the lighting limitation ratio of the plurality of lighting units, the operational processor is further adapted to store the first ratio to be set as a plurality of adjusting parameters of the plurality of lighting units.

15. The camera of claim 14, wherein the first ratio is normalized to acquire the plurality of adjusting parameters.

16. The camera of claim 11, wherein the first ratio is not set as the lighting limitation ratio of the plurality of lighting units while at least one of the plurality of first light intensity is out of the predetermined range.

17. The camera of claim 16, wherein while the first ratio is determined not to be set as the lighting limitation ratio of the plurality of lighting units, the operational processor is further adapted to drive the at least one image capturing unit to capture a second image by a second exposure duration, wherein the second exposure duration is longer than or shorter than the first exposure duration, to compute a plurality of second light intensity of the plurality of regions, to compare the plurality of second light intensity with the predetermined range, and to determine whether to set a second ratio about the plurality of second light intensity as the lighting limitation ratio of the plurality of lighting units according to a comparison result.

18. The camera of claim 17, wherein while the second ratio is determined not to be set as the lighting limitation ratio of the plurality of lighting units, the operational processor is further adapted to compare the plurality of second light intensity with the plurality of first light intensity, while one of the plurality of first light intensity or the plurality of second light intensity corresponding to the plurality of regions is out of the predetermined range and another one of the plurality of first light intensity or the plurality of second light intensity is within the predetermined range, the automatic light adjusting method utilizes the first ratio and the second ratio to acquire the lighting limitation ratio by numerical computation.

19. The camera of claim 11, wherein while a step of computing the plurality of first light intensity of the plurality of regions on the first image is executed, the operational processor is further adapted to compute light intensity distribution about each region from the plurality of regions, and to utilize the light intensity distribution within a threshold range to acquire a corresponding first light intensity by numerical computation.

20. The camera of claim 11, wherein while a step of computing the plurality of first light intensity of the plurality of regions on the first image is executed, the operational processor is further adapted to compute a plurality of light intensity distribution about the plurality of regions respectively, to weight the plurality of light intensity distribution out of a threshold range, and to utilize the plurality of weighted light intensity distribution to acquire the plurality of first light intensity by numerical computation.

* * * * *